United States Patent [19]
Katsumata et al.

[11] Patent Number: 5,891,943
[45] Date of Patent: Apr. 6, 1999

[54] THERMOPLASTIC RESIN COMPOSITION AND A METHOD OF PRODUCING THE SAME

[75] Inventors: Toru Katsumata; Hiromitsu Seito, both of Fuji, Japan

[73] Assignee: Polyplastics Co., Ltd., Japan

[21] Appl. No.: 877,999

[22] Filed: Jun. 18, 1997

[30] Foreign Application Priority Data

Jun. 28, 1996 [JP] Japan .................................... 8-169317

[51] Int. Cl.$^6$ ............................ C08L 67/02; C08L 51/04; C08L 51/06; C08L 55/02
[52] U.S. Cl. ........................ 524/310; 524/306; 524/311; 524/313; 524/315; 524/317; 524/318; 525/64; 525/449
[58] Field of Search ................................ 525/64; 524/318, 524/315, 306, 310, 311, 313, 317

[56] References Cited

U.S. PATENT DOCUMENTS 5,061,564  10/1991  Ohya et al. .

FOREIGN PATENT DOCUMENTS

| | | |
|---|---|---|
| 0 288 620 | 11/1988 | European Pat. Off. . |
| 0 354 802 | 2/1990 | European Pat. Off. . |
| 0 388 231 | 9/1990 | European Pat. Off. . |
| 0 435 171 A2 | 7/1991 | European Pat. Off. . |
| 3924449 A1 | 2/1990 | Germany . |
| 04076048 | 3/1992 | Japan . |
| 04076048A | 3/1992 | Japan . |
| 07150022 | 6/1995 | Japan . |
| 07150022A | 6/1995 | Japan . |

OTHER PUBLICATIONS

Chem Abs 125:144139 Sep. 1996.
WPI/Derwent 95–220855 Jul. 1995.
WPI/Derwent 95–243776 Aug. 1995.
Patent Abs Japan 04076048 Oct. 1992.

*Primary Examiner*—Patricia A. Short
*Attorney, Agent, or Firm*—Nixon & Vanderhye P.C.

[57] ABSTRACT

A thermoplastic resin composition which comprises (A) a thermoplastic polyester resin such as polybutylene terephthalate, (B) a rubber-modified styrenic resin such as an ABS resin, (C) an olefinic copolymer composed of (c-1) an olefinic polymer fragment and (c-2) a vinyl-series polymer fragment and (D) a branched ester obtainable from a $C_{16-30}$ fatty acid and/or alcohol having at least one branched chain, and which may contain (E) an inorganic filler, (F) a flame-retardant, (G) an inorganic flame-retardant auxiliary and so on. This resin composition has improved friction/abrasion characteristics with maintaining its high mechanical characteristics, and is useful for providing a moulded article including a sliding member.

20 Claims, No Drawings

5,891,943

THERMOPLASTIC RESIN COMPOSITION AND A METHOD OF PRODUCING THE SAME

FIELD OF THE INVENTION

This invention relates to a thermoplastic resin composition and a method of producing the same, which can improve its sliding characteristics or sliding properties and friction/abrasion characteristics with insuring a high level of mechanical characteristics, and a moulded article thereof.

BACKGROUND OF THE INVENTION

A crystalline thermoplastic polyester resin (e.g. a polyalkylene terephthalate resin), which has not only excellent mechanical properties, electrical properties, and other physical and chemical characteristics but also good processability, has been in use as an engeneering plastic for a wide range of products such as cars and vehicles, elecric or electronic parts.

Such a crystalline thermoplastic polyester resin can be used for various moulded articles by itself. For some applications, however, various reinforcing agents or additives are incorporated into the resin to improve its properties, in particular its mechanical properties. Where a high mechanical strength and rigidity is required, fibrous reinforcing agents, a glass fibre and a carbon fibre to name a few, are added to the crystalline thermoplastic resin. For a high dimentional stability and surface smoothness or surface properties, there has been a practice of adding a noncrystalline polymer such as a styrene-butadiene-acrylonitrile copolymer (ABS resin) to the polyester resin.

Required characteristics for the moulded article are getting higher and higher. For example, further improvement is hoped in sliding properties. A composition containing the fibrous reinforcing agent and a composition containing the noncrystalline polymer have a high mechanical strength and dimentional stability. However, once they are rubbed along with an article of a metal or a resin counterpart member, both of the resin compositions and the counterpart member (if the member is a resin) are worn out with creaking sounds only to deteriorate the sliding properties of the compositions. A moulded article which is made of a polyester incorporated with a noncrystalline polymer such as an ABS resin shows a poorer abrasion resistance with respect to the counterpart member of a resin than a moulded article comprising a polyester alone, and wears itself out to a great extent and spreads its worn-out powder.

As a solution to these problems, a grease has been conventionally applied to a sliding site. However, the performance can be declined once a grease runs out during a long operation period. By way of illustration, in the case of an information recording medium which demands high precision (e.g. a compact disc (CD), a read only memory (ROM) and other devices with high precision), attachment of a grease on the CD may cause a read error. Thus, improvement of slidability is a matter of great importance.

In order to enhance sliding properties, there has been suggested a composition blended with an agent for improving sliding characteristics including a PTFE (polytetrafluoroethylene) powder and a graphite (a black lead). Such a composition shows a slightly improved coefficient of friction, but its abrasion properties are not improved, rather on the further decline. Addition of the agent for improving sliding characteristics in a large amount, which is aimed at an achievement of a low friction coefficient, results in sacrificing the mechanical characteristics such as mechanical strength and toughness. Further improvements have been thus required.

Japanese Patent Application Laid-open No. 76048/1992 (JP-A-4-76048) discloses sliding parts which are made of a resin composition comprising a polybutylene terephthalate or a polyethylene terephthalate, a graft copolymer such as an ABS resin, and an inorganic filler, with an intention of improving friction/abrasion characteristics and preventing a creak or squeak while sliding.

Japanese Patent Application Laid-open No. 150022/1995 (JP-A-7-150022) discloses a polyester resin composition with a good slidability which comprises a crystalline thermoplastic polyester resin, an olefinic copolymer composed of an olefinic polymer fragment and a vinyl-series polymer fragment, and a fatty acid ester obtainable from a fatty acid having 12 or more carbon atoms.

Despite all these attempts, it is still difficult to enhance the friction/abrasion characteristics of the above-mentioned resin composition to a great extent while retaining the mechanical characteristics at a high level.

SUMMARY OF THE INVENTION

It is therefore an object of the present invention to provide a thermoplastic resin composition which has improved friction/abrasion characteristics with high mechanical characteristics and a method for producing the same, and a moulded article made of the resin composition.

Another object of the present invention is to provide a thermoplastic resin composition which has a low friction coefficient, prevents abrasion of the resin composition and the counterpart member and exhibits steady sliding characteristics during continuous reciprocating motions, a production method for the resin composition and a moulded article thereof.

The inventors of the present invention have made intensive researches to achieve an enhanced slidability compatible with a high mechanical strength and a dimensional stability, and found that addition of a specific polyolefinic copolymer in combination with a specific branched ester to a blend system of a polyester resin and a noncrystalline polymer can insure an improved initial sliding torque as well as impart a dramatically improved friction coefficient and abrasion resistance. The present invention is based on the above findings.

The thermoplastic resin composition of the present invention comprises (A) a thermoplastic polyester resin, (B) a rubber-modified styrenic resin, (C) an olefinic copolymer composed of (c-1) an olefinic polymer fragment and (c-2) at least one fragment of a vinyl-series polymer, and (D) a branched ester obtainable from a fatty acid having at least one branched chain and/or an alcohol having at least one branched chain. The thermoplastic resin composition may contain (E) an inorganic filler, (F) a flame-retardant, (G) an inorganic flame-retardant auxiliary, or the like. The thermoplastic resin composition is useful for producing a sliding member and other moulded articles.

DETAILED DESCRIPTION OF THE INVENTION

The components constituting the resin composition of the invention are hereinafter described in detail.

[(A) Thermoplastic Polyester Resin]

The thermoplastic polyester resin (A) can be obtained by condensation polymerisation of a dicarboxylic acid component and a dihydroxy component, condensation polymerisation of an oxycarboxylic acid component or condensation polymerisation of these three components, and may be whichever of a homopolyester or a copolyester.

Examples of the dicarboxylic acid component include terephthalic acid, isophthalic acid, phthalic acid, a naphthalene dicarboxylic acid (e.g. 2,6-naphthalene dicarboxylic acid), a diphenyl dicarboxylic acid, a diphenylether dicarboxylic acid, a diphenylmethane dicarboxylic acid, a diphenylethane dicarboxylic acid and other aromatic dicarboxylic acids or their derivatives; a cyclohexane dicarboxylic acid and other alicyclic dicarboxylic acids or their derivatives; adipic acid, azelaic acid, sebacic acid and other aliphatic dicarboxylic acids or their derivatives and the like. The above-mentioned derivatives may be ester-formable derivatives, for example, dimethyl ester and other lower alkyl esters, or an acid anhydride, an acid chloride and other acid halides. These dicarboxylic components may be used singly or in combination.

A preferable dicarboxylic acid component is an aromatic dicarboxylic acid such as terephthalic acid and naphthalene dicarboxylic acid.

As the dihydroxy component which constitutes the polyester (A), there may be exemplified ethylene glycol, propylene glycol, 1,3-butanediol, 1,4-butanediol, neopentyl glycol, hexanediol and other aliphatic alkylenediols; cyclohexanediol, cyclohexane dimethanol and other alicyclic diols; hydroquinone, resorcin, dihydoxyphenyl, naphthalenediol, dihydroxydiphenyl ether, 2,2-bis(4-hydroxyphenyl)propane (bisphenol A), an adduct of an alkylene oxide (a $C_{2-4}$ alkylene oxide such as ethylene oxide and propylene oxide) with bisphenol A (e.g. diethoxylated bisphenol A) and other aromatic diols; and polyoxyalkylene glycols (e.g. polyoxyethylene glycol, polyoxypropylene glycol, polytetramethylene ether glycol). These dihydroxy components may be ester-formable derivatives, for example, an alkyl group, an alkoxy group or a halogen-substituted derivative. The dihydroxy components can be used alone or in combination of two or more.

As a desirable dihydroxy component, an alkylenediol (particularly a $C_{2-4}$ alkylenediol) or an alicyclic diol may practically be used.

Examples of the oxycarboxylic acid include oxybenzoic acid, oxynaphthoic acid, diphenylene oxycarboxylic acid and other oxycarboxylic acids and their derivatives. The derivatives include those corresponding to the dicarboxylic acid component and the dihydroxy component mentioned above. These compounds can also be employed alone or in combination.

In addition to the above components, a small amount of a multi- or poly-functional monomer may be added in combination, examples of the monomer being a polycarboxylic acid such as trimellitic acid, trimesic acid and pyromellitic acid, and a polyhydric alcohol such as glycerin, trimethylolpropane and pentaerythritol. Use can be also made of a polyester having a branched or cross-linked structure produced in consequence of the use of the multifunctional monomer.

The crystalline thermoplastic polyester formed by condensation polymerisation using the above compounds as a monomer component is used singly or in combination as a base resin in the thermoplastic resin composition. The polyester resin may be noncrystalline but preferably be crystalline.

A desirable polyester resin comprises a crystalline polyester resin containing at least 60% or more by weight of a polyalkylene arylate unit such as a polyalkylene terephthalate unit or a polyalkylene naphthalate unit. Namely, the polyester resin can be composed of (i) a polyalkylene terephthalate (e.g. polyethylene terephthalate, polybutylene terephthalate) or a polyalkylene naphthalate (e.g. polyethylene naphthalate, polybutylene naphthalate), (ii) a copolymer containing at least 60% by weight (e.g. about 60 to 98% by weight) of a polyalkylene terephthalate unit or a polyalkylene naphthalate unit, or (iii) a polyester-series resin composition comprising a polyalkylene terephthalate or a polyalkylene naphthalate as a main constituent (e.g. 60 to 95% by weight). In particular, preferred polyesters include, a copolyester having a polybutylene terephthalate or a polybutylene naphthalate unit (e.g. a copolyester of a polyalkylene terephthalate or a polyalkylene naphthalate having 60 to 98% by weight of a polybutylene terephthalate unit), and a polyester-series resin composition comprising polybutylene terephthalate (e.g. a polyester-series resin composition including a polyalkylene terephthalate composition or a polyalkylene naphthalate composition each comprising 60 to 95% by weight of a polybutylene terephthalate).

[(B) Rubber-modified Styrenic Resin]

The rubber-modified styrenic resin (B) is a graft copolymer having at least an aromatic vinyl monomer (particularly, an aromatic vinyl monomer and a vinyl cyanide monomer) grafted to a rubber component, and may practically be a noncrystalline polymer in the form of a rubber.

As the rubber component, there may be exemplified a conjugated diene-series rubber (e.g. a polybutadiene, a polyisoprene, a butadiene-styrene copolymer, a butadiene-acrylonitrile copolymer, an ethylenepropylene-5-ethylidene-2-norbornene copolymer), an ethylene-propylene rubber (EPDM rubber), an acrylic rubber, an ethylene-vinyl acetate copolymer, a chlorinated polyethylene and other halogenated polyolefins. The rubber component may be a hydrogenated rubber. These rubber components can be used singly or in combination. A conjugated diene-series rubber may be practically employed as a preferable rubber component. The gel content of the conjugated diene-series rubber or other rubber components is not restricted in any respect. The rubber component can be produced by emulsion polymerisation, solution polymerisation, suspension polymerisation, block or bulk polymerisation or the like.

Examples of the aromatic vinyl monomer are styrene, α-methylstyrene, methylstyrene, t-butylstyrene, dimethylstyrene (vinyltoluene), chlorostyrene, dichlorostyrene, bromostyrene, dibromostyrene and the like. These aromatic vinyl monomers can be used independently or in combination. Preferred aromatic vinyl monomers include styrene and α-methylstyrene.

As the vinyl cyanide monomer, there may be mentioned acrylonitrile, methacrylonitrile and the like, among which acrylonitrile is desirable. The vinyl cyanide monomers can be used alone or in combination.

The aromatic vinyl monomer and the vinyl cyanide monomer may be employed together with other copolymerizable monomers. As the copolymerizable monomers, there ay be mentioned (meth)acrylates [e.g. a $C_{1-18}$ alkyl (meth)acrylate such as methyl (meth)acrylate, ethyl (meth)acrylate, butyl (meth)acrylate, t-butyl (meth)acrylate, hexyl (meth)acrylate, octyl (meth)acrylate and 2-ethylhexyl (meth)acrylate; 2-hydroxyethyl (meth)acrylate, 2-hydroxypropyl (meth) acrylate, and other (meth)acrylates containing a hydroxy group; glycidyl (meth)acrylate], carboxyl group-containing monomers [e.g. unsaturated monocarboxylic acids such as (meth)acrylic acid and crotonic acid; aliphatic unsaturated dicarboxylic acids such as maleic anhydride, maleic acid, fumaric acid and itaconic acid; unsaturated dicarboxylic acid monoesters including monoester maleates (e.g. a $C_{1-10}$ monoalkyl maleate such as monomethyl maleate, monoethyl maleate, monobutyl maleate and mono-2-ethylhexyl maleate) and their corresponding fumaric acid monoesters], maleimide-series monomers (e.g. maleimide, N-methylmaleimide, N-phenylmaleimide) and so on. These copolymerizable monomers can be used alone or in combination.

Desired copolymerizable monomers include a (meth) acrylate (methyl methacrylate, in particular), a maleimide-series monomer (especially, N-phenylmaleimide), (meth) acrylic acid and maleic anhydride.

The proportion of the aromatic vinyl monomer, the vinyl cyanide monomer and the copolymerizable monomer is not specifically restricted as far as the aromatic vinyl monomer (preferably, the aromatic vinyl monomer and the vinyl cyanide monomer) is contained at least. For example, the proportion of the aromatic vinyl monomer/the vinyl cyanide monomer is about 10/90 to 90/10 (weight %), preferably about 20/80 to 80/20 (weight %) and more preferably about 30/70 to 70/30 (weight %). The proportion of the aromatic vinyl-series monomer relative to the copolymerizable monomer is such that the former/the latter is in the range of about 10/90 to 100/0 (weight %) and preferably in the range of about 30/70 to 70/30 (weight %).

The ratio of the rubber component and the monomer in the graft polymer is not strictly limited. The rubber component/ the monomer ratio equals about 10/90 to 75/25 (weight %), preferably about 10/90 to 50/50 (weight %) and more preferably about 10/90 to 40/60 (weight %). A resin composition with a rubber component content of less than 10% by weight is inferior in the impact resistance. On the other hand, a resin composition with a rubber component content of more than 75% by weight is more likely not only to develop flow marks on the moulded article and to present a degraded external appearance, but also to show poorer affinities for the component (A).

The rubber-modified styrenic-resins (B) (graft polymers) can be used alone or as a mixture of two or more species.

Favourable graft polymers include, for instance, a styrene-acrylonitrile-butadiene copolymer (ABS resin), a styrene-acrylonitrile-ethylene copolymer, a styrene-series block copolymer (e.g. a styrene-butadiene-styrene (SBS) copolymer, a styrene-isoprene-styrene (SIS) copolymer, a styrene-ethylene-butylene-styrene copolymer, etc.), a styrene-acrylonitrile-ethylene-propylene-ethylidenenorbornene copolymer (AES) and their hydrogenated products. Particularly preferred graft polymers include a styrene-acrylonitrile-butadiene copolymer (ABS resin), a styrene-acrylonitrile-ethylene-propylene-ethylidenenorbornene copolymer (AES) and their hydrogenated products.

The proportion of the thermoplastic polyester resin (A) and the rubber-like polymer (B) can be selected in a wide range. For example, the proportion of (A)/(B) is in the range of about 95/5 to 30/70 (weight %) and preferably about 90/10 to 40/60 (weight %).

[(C) Olefinic Copolymer]

A feature of the present invention resides in that an agent for improving sliding characteristics comprising (C) the olefinic copolymer and (D) the branched ester is added to the polyester-series resin composition comprising the above components (A) and (B).

The olefinic copolymer (C) is a graft or block copolymer having a branched or cross-linked structure where (c-1) an olefinic polymer and (c-2) at least one vinyl-series polymer are chemically bonded.

The main chain of the component (C) may practically comprise the olefinic polymer (c-1), the examples of which are a polyethylene (e.g. a low density polyethylene, a ultra-low density polyethylene, a linear low density polyethylene, a medium density polyethylene, a high density polyethylene), a polypropylene, a polybutene and other homopolymers of poly α-olefins, a hydrogenated polybutadiene, and copolymers comprising the aforesaid as main components. As the copolymers, there may be mentioned, for example, an ethylene-propylene copolymer, an ethylene-1-butene copolymer, an ethylene-ethyl acrylate copolymer and other ethylene-(meth)acrylate copolymers, an ethylene-(meth)acrylic acid copolymer and an ethylene-vinyl acetate copolymer. Among them, the polyethylene, the polypropylene and the ethylene-propylene copolymer are desirable.

The vinyl-series polymer (c-2) is a homo- or copolymer of at least one monomer selected from a variety of vinyl-series monomers such as acrylic monomers [e.g. (meth)acrylate, (meth)acrylonitrile, etc.], vinyl ester-series monomers (e.g. vinyl acetate, vinyl propionate, etc.) or styrenic monomers (e.g. styrene, α-methyl-styrene, etc.). A preferable monomer includes at least one member selected from the acrylic monomers or the styrenic monomers. As the vinyl-series polymers (c-2), there may be exemplified acrylic polymers (e.g. polymethyl methacrylate, polyethyl methacrylate, polybutyl methacrylate, polymethyl acrylate, polyethyl acrylate, polybutyl acrylate, poly 2-ethylhexyl acrylate, a methyl methacrylate-ethyl acrylate copolymer, a methyl methacrylate-butyl acrylate copolymer and other homo- or co-polymers of a $C_{1-18}$ alkyl (meth)acrylate), aromatic vinyl polymers (e.g. a polystyrene), polyacrylonitrile, an acrylonitrile-aromatic vinyl copolymer (e.g. an acrylonitrile-styrene copolymer), a (meth)acrylate-styrene copolymer (e.g. a methyl methacrylate-styrene copolymer, an ethyl acrylate-styrene copolymer, a butyl acrylate-styrene copolymer) and the like.

Desirable vinyl-series polymers (c-2) include poly(meth) acrylates (e.g. polymethyl methacrylate) and styrene-containing polymers (e.g. acrylonitrile-styrene copolymers, polystyrenes).

The graft or block copolymer (C) is distinguished in that it has a chained, branched or cross-linked structure in which the olefinic polymer (c-1) and the vinyl-series polymer (c-2) each having independent characteristics are chemically bonded at least one or more positions. Owing to the graft or block structure, remarkable effects can be expected which would be impossible in the case of single use of the olefinic polymer (c-1) or the vinyl-series polymer (c-2).

The method for preparing the graft or block copolymer composed of the olefinic polymer segment (c-1) and the vinyl-series polymer segment (c-2) is not strictly specified, and the copolymer can be prepared easily, for instance, according to a conventional radical reaction. By way of illustration, the graft or block copolymer can be prepared by a method which comprises adding a radical catalyst to a mixture of the olefinic polymer (c-1) and the vinyl-series polymer (c-2) and melt-mixing or kneading the mixture, or a method which comprises adding a radical catalyst (e.g. a peroxide) to either of the olefinic polymer (c-1) or the vinyl-series polymer (c-2) to generate a free radical and melt-mixing or kneading the free radical-containing polymer component with the other polymer component.

The proportion of the olefinic polymer (c-1) and the vinyl-series polymer (c-2) which constitute the graft or block copolymer (C) is, for example, such that (c-1)/(c-2) equals about 95/5 to 40/60 (weight %) and preferably about 90/10 to 40/60 (weight %). When the proportion of the olefinic polymer (c-1) exceeds 95% by weight, the compatibility and affinity for the polyester resin is decreased, and the composition develops an apparent separation. The peeling and abrasion characteristics tend to decrease as well. When the proportion of (c-1) is lower than 40% by weight, the modification effect of the polyester resin is lowered, leaving a friction coefficient scarcely improved.

The graft or block copolymer (C) is available in the market, sold by Nippon Oil and Fats (NOF) Corporation, under trade names "MODIPER A 1400," "MODIPER A 1200" and "MODIPER A 1100," to name a few.

The amount of the graft or block copolymer (C) is, for instance, about 0.1 to 40 parts by weight (e.g. 1 to 40 parts by weight), preferably about 1.5 to 30 parts by weight and more preferably about 2 to 20 parts by weight, relative to 100 parts by weight of the total amount of the polyester resin (A) and the rubber-modified styrenic resin (B). If the ratio of the component (C) is too small, the sliding characteristics is not so enhanced as desired. An excessive amount of (C) causes the surface to peel off, deteriorating the external appearances of the moulded article.

[(D) Branched Ester]

The branched ester (D) is a fatty acid ester derived from an alcohol having at least one branched chain and/or a fatty acid having at least one branched chain.

Typical examples of the fatty acid having a branched chain (a chain-branched fatty acid) which constitutes the branched ester are iso-acid, anteiso-acid and the like, but not necessarily limited to them Any branched fatty acid may be used as the constitutive component of the ester.

As the chain-branched fatty acid, it is desirable to select a higher fatty acid such as a saturated or unsaturated fatty acid having 16 or more carbon atoms (e.g. about 16 to 30, preferably about 16 to 22 carbon atoms), and specifically, isopalmitic acid, isostearic acid, isobehenic acid and so on. Preferable branched fatty acids include saturated higher fatty acids.

As the alcohol having a branched chain (a branched alcohol), there may be mentioned, preferably, a higher alcohol such as a saturated or unsaturated alcohol having 16 or more carbon atoms (e.g. about 16 to 30, and preferably about 16 to 22 carbon atoms), and specifically, isotridecyl alcohol, hexyldecyl alcohol, octyldodecyl alcohol, isostearyl alcohol and the like. Preferable branched alcohols include saturated higher alcohols.

Examples of the alcohol which constitutes the branched ester in combination with the fatty acid having a branched chain are, in addition to the aforesaid alcohols having a branched chain, straight-chained aliphatic alcohols (preferably a straight-chained saturated higher alcohol having about 14 to 30 carbon atoms, and in particular a straight-chained saturated higher alcohol having about 14 to 22 carbon atoms) such as myristyl alcohol, cetyl alcohol, stearyl alcohol and behenyl alcohol; and polyhydric alcohols such as ethylene glycol, diethylene glycol, triethylene glycol, polythylene glycol, propylene glycol, dipropylene glycol, ripropylene glycol, tetramethylene glycol, neopentyl glycol, glycerin, diglycerin, trimethylolpropane, pentaerythritol, dipentaerythritol and sorbitan. These alcohols can be employed singly or as a mixture of two or more species.

Examples of the fatty acid which constitutes the branched ester together with the alcohol having a branched chain include, in addition to the above fatty acids having a branched chain, straight-chained fatty acids (preferably a straight-chained saturated higher fatty acid having about 14 to 30 carbon atoms, in particular, a straight-chained saturated higher fatty acid having about 14 to 22 carbon atoms) such as myristic acid, palmitic acid, stearic acid, behenic acid, cerotic acid and montanic acid; aliphatic polycarboxylic acid such as citric acid, succinic acid, adipic acid, azelaic acid and sebacic acid; and aromatic polycarboxylic acids such as phthalic acid, phthalic anhydride, isophthalic acid, terephthalic acid, trimellitic acid and pyromellitic acid. These fatty acids may also be used alone or in combination.

In terms of the long-term sliding stability, extrudability or extruding properties, mouldability and other processabilities, it is desirable to use, as the branched ester, (1) an ester derived from the branched saturated fatty acid, (2) an ester derived from the branched saturated alcohol, (3) an ester derived from the branched saturated fatty acid and the branched saturated alcohol, and (4) an ester derived from the branched saturated fatty acid and the polyhydric alcohol (preferably, an ester of dodecylstearic acid or isostearic acid, and one or more polyhydric alcohols selected from the group consisting of ethylene glycol, polyethylene glycol, propylene glycol, glycerin, trimethylolpropane and pentaerythritol), and a partial ester (a partially esterified compound or an ester having one or more unreacted OH groups in a molecule) is particularly desirable.

Incorporation of a branched ester oil provides high sliding characteristics. The branched ester is preferably an ester oil having a melting point of not higher than 40° C., preferably a liquid ester oil having a melting point of 25° C. or lower.

The amount of the branched ester (D) is, for example, about 0.1 to 15 parts by weight (e.g. 0.1 to 10 parts by weight), preferably about 0.5 to 10 parts by weight and more preferably about 1 to 10 parts by weight relative to 100 parts by weight of the resin composition comprising the component (A) and the component (B), that is, the total amount of the components (A) and (B). When the incorporated amount of the branched ester (D) is less than 0.1 part by weight, the sliding characteristics cannot be enhanced effectively. If the amount exceeds 15 parts by weight, the abrasion characteristics and the external appearances of the moulded article are sacrificed.

The proportion of the olefinic copolymer (C) and the branched ester (D) is not particularly limited. However, it is preferable that the proportion of (D)/(C) is in the range of 1 to 30% by weight and preferably 5 to 25% by weight, in terms of the friction/abrasion characteristics and the surface properties or conditions of the moulded article.

The polyester composition which is prepared by incorporating both of the component (C) and the component (D) into the components (A) and (B) has a good dimensional stability and excellent friction/abrasion characteristics. Especially, the composition shows prominent friction/abrasion characteristics in relation to resin or metal materials, when used as a chassis of a set of electric/electronic parts as well as a material for a tray, a bearing, a gear, a cam or the like. Although a single addition of either the component (C) or the component (D) to the components (A) and (B) may exhibit the effects to some degrees, the addition has to be conducted in a large amount in order to give satisfying effects. As a result, the strength (rigidity) as well as the surface conditions and mouldability of the composition are more likely to deteriorate.

Blending of the ester (the ester oil, in particular), which is apt to bleed, results in not only difficulty in retaining the sliding characteristics for a long period of time, but also vapourisation and spread of the ester oil on exposure to the high temperature environment during the extrusion process and the moulding or fabrication process, and thus the oil cannot be utilised effectively. The present invention solves the problem by concurrently adding the branched ester (D)

in combination with the olefinic copolymer (C). Moreover, the olefinic copolymer (C) prevents the polyolefin component from peeling off due to the branched ester (D) and helps provide a polyester resin composition having high abrasion characteristics without any deterioration of the abrasion resistance.

Addition of an inorganic filler (E) such as a glass fibre to the polyester resin composition insures a production of a polyester resin composition having excellent friction/abrasion characteristics with good strength (rigidity) and heat resistance. Further incorporation of the component (F) as a flame-retardant, and the component (G) as a flame-retardant auxiliary helps provide a polyester resin composition having not only an enhanced slidability but also a remarkable flame-retardancy.

[(E) Inorganic Filler]

The inorganic filler (E) is useful for obtaining a moulded article which is superior in the mechanical strength, rigidity, heat resistance, electrical haracteristics and other characteristics. The forms of the inorganic filler (E) is liberally selected depending on the intended use of the product, e.g. in the form of a fibre, a particle or a plate. A fibrous filler is preferably employed for a high mechanical strength and rigidity.

As the fibrous filler, there may be mentioned a glass fibre, an asbestos fibre, a carbon fibre, a silica fibre, a silica-alumina fibre, a zirconia fibre, a potassium titanate fibre, a boron nitrite fibre, a metal fibre (a fibrous form of metals including stainless, aluminium, titanium, copper, brass and the like) and other inorganic fibres. A typical fibrous filler is a glass fibre or a carbon fibre. Additionally, an organic fibre with a high melting point (e.g. an aliphatic or aromatic polyamide, an aromatic polyester, a fluororesin, polyacrylonitrile and other acrylic resins) can be utilised as well.

As the particulate filler, there may be mentioned, silica, a quarts powder, a glass bead, a glass powder, a milled glass fibre, calcium silicate, aluminium silicate, kaolin, a talc, clay, diatomaceous earth, wollastnite and other silicates; iron oxide, titanium oxide, zinc oxide, alumina and other metal oxides; calcium carbonate, magnesium carbonate and other metal carbonates; calcium sulfate, barium sulfate and other metal sulfates; silicon carbide and other metal powders.

Plate-like fillers include, for instance, a mica, a glass flake, various metal foils and so on.

As the non-fibrous inorganic fillers, a glass flake, a mica powder, a talc, a glass bead, a milled glass fibre are preferably used.

These fillers (E) can be employed singly or in combination. Combined use of the fibrous fillers, particularly a combination of a glass fibre with the particulate and/or the plate-like filler, is advantageous to a production of a moulded article equipped with a dimensional precision and electrical characteristics as well as a mechanical strength.

It is desirable to use these fillers (E), where necessary, with a bundling or convergent agent or a surface-treating agent, such as an epoxy-series compound, an acrylic compound, an isocyanate-series compound, a silane-series compound, a titanate-series compound and other functional compounds. The fillers may be subjected to a surface-treatment or bundling treatment in advance, or the compounds may be added simultaneously in the preparation process.

Although the amount of the filler (E) is not critical, addition in an excessively large amount causes the filler to appear on the surface of the moulded article with degrading the abrasion resistance. The amount of the filler (E) is, for instance, about 0 to 80 parts by weight, preferably about 0 to 50 parts by weight, relative to 100 parts by weight of the total amount of the components (A) and (B).

[(F) Flame-Retardant]

Any compound generally used as a flame-retardant for a thermoplastic polyester resin is suitable for the flame-retardant (F) so far as not sacrificing the friction/abrasion characteristics. Favourable flame retardants (F) include an organic halogen compound such as a halogenated phenyl compound, a halogenated diphenylether, a halogenated aromatic bisimide compound, a halogenated aromatic epoxy compound, a low molecular weight-organic halogen compound of bisphenol A, a halogenated polycarbonate and a halogenated polystyrene. The halogen of the organic halogen compound may be any of fluorine, chlorine, bromine or iodine, but it is mostly bromine. The flame-retardant can be used independently or in combination of two or more species.

The content of the flame-retardant (F) is, for instance, about 0.5 to 25 parts by weight, preferably about 1 to 20 parts by weight (e.g. 2 to 20 parts by weight) relative to 100 parts by weight of the total amount of the components (A) and (B). Excessive addition of the flame-retardant is likely to deteriorate the mechanical and physical characteristics, and thermal stability as well as to give a flawed external appearance of the moulded resin article. However, it is hard to improve the flame-retardancy if the amount is too little.

[(G) Inorganic Flame-Retardant Auxiliary]

Any known compound widely used as an inorganic flame-retardant auxiliary for a thermoplastic polyester can be used as the inorganic flame-retardant auxiliary (G) unless it decreases the friction/abrasion characteristics intended in the invention. As the preferable inorganic flame-retardant auxiliary (G), there may be mentioned, for example, antimony trioxide, antimony tetraoxide, antimony pentaoxide, a halogenated antimony, sodium antimonate, aluminium hydroxide, magnesium hydroxide, tin dioxide, zirconium oxide, zinc metaborate, barium borate, and molybdenum oxide. These inorganic flame-retardant auxiliary (G) can be used alone or in combination.

The content of the inorganic flame-retardant auxiliary (G) is, for instance, about 0.1 to 20 parts by weight, preferably about 1 to 10 parts by weight relative to 100 parts by weight of the total amount of the component (A) and the component (B). The flame-retardancy of the composition cannot be improved if the amount of the component (G) is less than 0.1 part by weight, whereas the strength (rigidity) of the composition is likely to be decreased with an addition of more than 20 parts by weight.

For some applications of the moulded article, the flame-retardancy may require a V-0 level of the Subject 94 of Underwriter's Laboratory Co., Ltd. In this case, use of an asbestos or a fluororesin (e.g. polytetrafluoroethylene) together with the flame-retardant is effective.

Where necessary, variety of additives (e.g. an antioxidant, an ultraviolet absorber, a photostabiliser and other stabilisers, antistatic agents, slipping agents, a dye, a pigment and other colouring agents, lubricants, plasticizers) may be added to the composition of the present invention. A moulded article obtained with an addition of an antioxidant shows a higher thermostability, in particular, a higher long-term thermostability, and mechanical physical properties.

As the antioxidants, there may be used hindered phenol-series, amine-series or thioether-series compounds, and the like.

Examples of the hindered phenol-series compound are 1,6-hexanediol-bis[3-(3,5-di-t-butyl-4-hydroxyphenyl) propionate], pentaerythritol-tetrakis[3-(3,5-di-t-butyl-4- hydroxyphenyl)propionate], triethylene glycol bis[3-(3-t-butyl-5-methyl-4-hydroxyphenyl)propionate] and so on.

Examples of the amine-series compound include N-phenyl-N'-isopropyl-p-phenylenediamine, N,N'-diphenyl-p-phenylenediamine, 4,4-bis-(4-α,α-dimethylbenzyl)di-phenylamine, a condensate of a diphenylamine and acetone, N-phenylnaphthylamine, and N,N'-di-β-naphthylhenylenediamine.

Examples of the thioether-series compound include dilaurylthio dipropionate, dimirystylthio dipropionate, distearylthio dipropionate, lauryl stearylthio dipropionate, tetrakis[methylene-3-(dodecylthio)propionate]methane, and dialkyl($C_{12}$–$C_{18}$)-3,3-thio dipropionates.

Desirable antioxidants include hindered phenol-series compounds such as pentaerythritol-tetrakis[3-(3,5-di-t-butyl-4-hydroxyphenyl)propionate] and triethylene glycol-bis[3-(3-t-butyl-5-methyl-4-hydroxyphenyl)propionate].

It is advantageous to add a slipping agent (or lubricant) for enhancement of a feeding stability of the feed components in the extrusion moulding and other moulding processes.

The composition of the present invention can be prepared by a conventional mixing method (e.g. dry mixing, melt mixing such as melt extruding or melt kneading). The composition may be powdery, particulate, or in the form of a pellet or a flake.

The moulded article of the present invention can be prepared easily by a conventional method (e.g. extrusion moulding, injection moulding, etc.). By way of illustration, the composition or the moulded article can be prepared according to any of the following methods: a method which comprises mixing the components, kneading and extruding the mixture using a monoaxial or biaxial extruder to give a pellet, and moulding an article using the pellet; a method which comprises preparing pellets each having different compositions, thereafter mixing the pellets in predetermined amounts and moulding the mixture to give a moulded article with a determined proportion of the components; or a method which comprises directly feeding one or more components directly into the moulding machine. As for the incorporation of the resin component, it is desirable to add a portion of the resin component which is finely powdered and blended with the other components, as this procedure helps to mix these components homogeneously.

The composition of the present invention, which shows excellent mechanical characteristics and sliding property, is extremely useful for producing a moulded part (e.g. a lever, a gear, a bearing, a chassis and other mechanical parts for which high dimensional stability and slidability is required) which constitutes audio visual (AV)/office automation (OA) devices [e.g. a video tape recorder, a video camera, a video disk player, a compact disk (CD) player, a word processor or personal computer equipped with a CD-ROM, a copying machine, a printer and so on]. The polyester resin composition containing the inorganic filler and/or the flame-retardant, which shows a prominent flame-retardancy, high mechanical characteristics, good heat resistance and remarkable sliding characteristics, is advantageous to applications for a moulded part (e.g. built-in chassis parts of a computer provided with a high-speed CD-ROM, DVD and others) for which proper slid-ability under a high speed operation is required.

The resin composition of the present invention comprises a polyester/graft copolymer blend composition composed of a specific polyolefin copolymer and a specific branched ester oil. Consequently, the friction/abrasion characteristics of the moulded article can be dramatically improved, with keeping its high mechanical characteristics. Further, the resin composition can provide a moulded article which can prevent abrasion of the resin composition and the counterpart member and exhibit stable sliding characteristics with a good dimensional stability and a low friction coefficient during continuous reciprocating motions.

The following examples are intended to give further details of the present invention and should by no means interpreted as defining the scope of the invention.

EXAMPLES

Examples 1 to 22

The component (A) [a polybutylene terephthalate resin (PBT), or an acid-modified polybutylene terephthalate (acid-modified PBT) obtained by substituting 12 mol % of a terephthalic acid component with isophthalic acid], the component (B) (an ABS resin or an AES resin), the olefinic copolymer component (C) as named below, the ester component (D) having a branched chain, and, where necessary, the inorganic filler (E), the flame-retardant (F) and the flame-retardant auxiliary (G), were mixed in the proportions shown in Tables, and then melt-kneaded using a biaxial or twin-screw extruder to give a composition in the form of a pellet. A test piece was produced using the pellet by injection-moulding, characteristics of which was estimated. The results were shown in Tables.

Comparative Example 1 to 21

To make a comparison with the results of Examples, evaluations were conducted in relation to the following compositions as shown in Tables: a composition comprising neither or either of the component (C) or (D), a composition comprising a polyethylene in place of the component (C), a composition comprising a lubricant (PTFE) as a component (D'), a composition comprising a fatty acid ester other than the component (D) in combination with the component (B) and such. The test piece was prepared in the same manner as Example 1. The results were set forth in Tables.

The components (C) and their constituents (c-1) and (c-2) are listed below, which are represented in abbreviation in Tables.

Component (C) (the values in parentheses are based on weight %)
PE-g-PMMA: a graft copolymer of PE (50) and PMMA (50)
PE-g-AN/S: a graft copolymer of PE (50) and AN/S (50)
PE-g-PS: a graft copolymer of PE (50) and PS (50)
PP-g-AN/S: a graft copolymer of PP (70) and AN/S (30)
Component (c-1)
PE: low density polyethylene
PP: polypropylene
Component (c-2)
PMMA: polymethyl methacrylate
AN/S: acrylonitrile-styrene copolymer
PS: polystyrene The evaluation was performed based on the following items and methods.

(1) Surface conditions of the moulded article

Test pieces (100 mm×15 mm×3 mm) were moulded under the following conditions. Degree of peeling or spalling on the surface was evaluated by the following five grades.
[Moulding conditions]
Moulding machine: IS80 (Toshiba Corporation, Japan)
Cylinder temperature(°C.): 255° C. at the nozzle,
   250° C. at the head,
   240° C. at the centre,
   230° C. at the lower hopper
Injection pressure: 75 MPa
Injection speed: 1.2 m/min.

Mould temperature: 70° C.
[Criteria for evaluation]
5: No peeling on the surface
4: Very slight peeling
3: Moderate peeling
2: Peeling on the majority of the surface
1: Serious peeling on the whole surface
(2) Sliding characteristics Using a simplified reciprocating slide testing machine, the friction/abrasion test was conducted under the following conditions to measure a coefficient of dynamic friction and abrasion loss.

[Test conditions]
Load=4N, Velocity (V)=5 cm/sec., Stroke (L)=5 cm,
Sliding motions: 30,000 times

[Test procedure]
A pin ($\phi$ 10 mm) was brought into contact with the longitudinal end surface (end width: about 3 mm) of a moving test piece (a plate, about 3 mm in thickness). The test piece was moved back and forth at a predetermined stroke in the longitudinal direction, while a load is imposed by the pin in the cross direction of the test piece. Used as the pin is an ABS resin (DAICEL CHEMICAL INDUSTRIES, LTD., trade name "CEVIAN"), an ABS resin/polycarbonate (PC) resin (DAICEL CHEMICAL INDUSTRIES, LTD., trade name "NOVALLOY S") or a steel (S55C).

(3) Modulus of bending elasticity

Modulus of bending elasticity was measured in accordance with ASTM D-790.

(4) Flammability test (UL-94)

According to the process of Underwriter's Laboratories, Co., Ltd., Subject 94 (UL94), flame-retardancy and the degree of dripping of the resins during combustion were tested using 5 test pieces (thickness: 0.8 mm) to determine flammability levels.

TABLE 1

|  |  | Ex.1 | Ex.2 | Ex.3 | Ex.4 | Ex.5 | Ex.6 | Ex.7 | Ex.8 |
|---|---|---|---|---|---|---|---|---|---|
| (A) | PBT | 70 | 50 | 70 | 70 | 70 | 70 | 70 | 70 |
|  | Acid-modified PBT |  |  |  |  |  |  |  |  |
| (B) | ABS | 30 | 50 | 30 | 30 | 30 | 30 | 30 | 30 |
|  | AES |  |  |  |  |  |  |  |  |
| (C) | PE-g-AN/s | 5.0 | 5.0 | 10.0 | 2.0 |  |  |  | 5.0 |
|  | PE-g-PMMA |  |  |  |  | 5.0 |  |  |  |
|  | PE-g-PS |  |  |  |  |  | 5.0 |  |  |
|  | PP-g-AN/S |  |  |  |  |  |  | 5.0 |  |
| (D) | Ethylene glycol monoisostearate | 2.0 | 2.0 | 5.0 | 0.5 | 2.0 | 2.0 | 2.0 |  |
|  | Isotridecyl stearate |  |  |  |  |  |  |  | 2.0 |
|  | Octyldodecyl stearate |  |  |  |  |  |  |  |  |
|  | Isostearyl stearate |  |  |  |  |  |  |  |  |
| (E) | Glass fibre |  |  |  |  |  |  |  |  |
|  | Glass flake |  |  |  |  |  |  |  |  |
| (F) | Brominated epoxy resin |  |  |  |  |  |  |  |  |
|  | Polypentabromobenzyl acrylate |  |  |  |  |  |  |  |  |
| (G) | Antimony trioxide |  |  |  |  |  |  |  |  |
|  | Surface of the moulded article | 5 | 5 | 5 | 5 | 5 | 5 | 5 | 5 |
|  | Bending elastic modulus (MPa) | 2,400 | 2,380 | 2,210 | 2,490 | 2,430 | 2,380 | 2,380 | 2,420 |
|  | Sliding properties |  |  |  |  |  |  |  |  |
|  | Counterpart member | ABS/Steel | ABS/Steel | ABS/Steel | ABS/Steel | ABS | ABS | ABS | ABS |
|  | Dynamic friction coefficient | 0.18/0.20 | 0.22/0.22 | 0.15/0.16 | 0.25/0.27 | 0.21 | 0.22 | 0.23 | 0.17 |
|  | Abrasion amount (mg) |  |  |  |  |  |  |  |  |
|  | Test piece | 0.1/0.2 | 0.2/0.4 | 0/0.1 | 0.3/0.5 | 0.1 | 0.1 | 0.1 | 0.1 |
|  | Counterpart member | 0.2/0 | 0.4/0 | 0.1/0 | 0.5/0 | 0.3 | 0.3 | 0.4 | 0.2 |
|  | Flame-retardancy (UL-94) Thickness: 0.8 mm | — | — | — | — | — | — | — | — |

N.B. Acid-modified PBT: a polybutylene terephthalate resin modified with 12 mol % of isophthalic acid

TABLE 2

|  |  | Ex. 9 | Ex.10 | Ex.11 | Ex.12 | Ex.13 | Ex.14 | Ex.15 | Ex.16 |
|---|---|---|---|---|---|---|---|---|---|
| (A) | PBT | 70 | 70 | 70 |  | 70 | 50 | 70 | 70 |
|  | Acid-modified PBT |  |  |  | 70 |  |  |  |  |
| (B) | ABS | 30 | 39 |  | 30 | 30 | 50 | 30 | 30 |
|  | AES |  |  | 30 |  |  |  |  |  |
| (C) | PE-g-AN/S | 5.0 | 5.0 | 5.0 | 5.0 | 5.0 | 5.0 | 5.0 |  |
|  | PE-g-PMMA |  |  |  |  |  |  |  | 5.0 |
|  | PE-g-PS |  |  |  |  |  |  |  |  |
|  | PP-g-AN/S |  |  |  |  |  |  |  |  |
| (D) | Ethylene glycol monoisostearate |  |  | 2.0 | 2.0 | 2.0 | 2.0 |  |  |
|  | Isotridecyl stearate |  |  |  |  |  |  | 2.0 | 2.0 |
|  | Octyldodecyl stearate | 2.0 |  |  |  |  |  |  |  |
|  | Isostearyl stearate |  | 2.0 |  |  |  |  |  |  |

TABLE 2-continued

|  |  | Ex. 9 | Ex.10 | Ex.11 | Ex.12 | Ex.13 | Ex.14 | Ex.15 | Ex.16 |
|---|---|---|---|---|---|---|---|---|---|
| (E) | Glass fibre |  |  |  | 20 | 20 | 20 | 20 |  |
|  | Glass flake |  |  |  |  |  |  | 20 | 20 |
| (F) | Brominated epoxy resin |  |  |  |  |  |  |  |  |
|  | Polypentabromobenzyl acrylate |  |  |  |  |  |  |  |  |
| (G) | Antimony trioxide |  |  |  |  |  |  |  |  |
| Surface of the moulded article | | 5 | 5 | 5 | 5 | 5 | 5 | 5 | 5 |
| Bending elastic modulus (MPa) | | 2,400 | 2,390 | 2,430 | 2,390 | 5,900 | 5,840 | 7,200 | 7,280 |
| Sliding properties | | | | | | | | | |
| Counterpart member | | ABS | ABS | ABS | ABS | ABS/ABS/PC | ABS/ABS/PC | ABS/ABS/PC | ABS/ABS/PC |
| Dynamic friction coefficient | | 0.20 | 0.22 | 0.17 | 0.20 | 0.21/0.19 | 0.24/0.20 | 0.22/0.20 | 0.26/0.23 |
| Abrasion amount (mg) | | | | | | | | | |
| Test piece | | 0.2 | 0.2 | 0 | 0.2 | 0/0 | 0.2/0.1 | 0/0 | 0.1/0.1 |
| Counterpart member | | 0.3 | 0.3 | 0.1 | 0.2 | 0.6/0.3 | 0.8/0.4 | 0.4/0.2 | 0.6/0.4 |
| Flame-retardancy (UL-94) Thickness: 0.8 mm | | — | — | — | — | — | — | — | — |

N.B. Acid-modified PBT: a polybutylene terephthalate resin modified with 12 mol % of isophthalic acid

TABLE 3

|  |  | Ex.17 | Ex.18 | Ex.19 | Ex.20 | Ex.21 | Ex.22 |
|---|---|---|---|---|---|---|---|
| (A) | PBT | 70 | 70 | 70 | 70 | 70 | 70 |
|  | Acid-modified PBT |  |  |  |  |  |  |
| (B) | ABS |  | 30 | 30 | 30 | 30 | 30 |
|  | AES | 30 |  |  |  |  |  |
| (C) | PE-g-AN/S | 5.0 | 5.0 | 5.0 | 5.0 | 5.0 | 5.0 |
|  | PE-g-PMMA |  |  |  |  |  |  |
|  | PE-g-PS |  |  |  |  |  |  |
|  | PP-g-AN/S |  |  |  |  |  |  |
| (D) | Ethylene glycol monoisostearate | 2.0 |  |  |  |  | 2.0 |
|  | Isotridecyl stearate |  | 2.0 | 2.0 | 2.0 | 2.0 |  |
|  | Octyldodecyl stearate |  |  |  |  |  |  |
|  | Isostearyl stearate |  |  |  |  |  |  |
| (E) | Glass fibre | 20 | 20 | 20 | 20 |  | 20 |
|  | Glass flake |  |  | 20 |  |  |  |
| (F) | Brominated epoxy resin |  | 15 | 15 |  | 15 | 15 |
|  | Polypentabromobenzyl acrylate |  |  |  | 15 |  |  |
| (G) | Antimony trioxide |  | 5 | 5 | 5 | 5 | 5 |
| Surface of the moulded article | | 5 | 5 | 5 | 5 | 5 | 5 |
| Bending elastic modulus (MPa) | | 6,000 | 6,050 | 7,340 | 6,040 | 3,150 | 6,040 |
| Sliding properties | | | | | | | |
| Counterpart member | | ABS/ABS/PC | ABS/ABS/PC | ABS/ABS/PC | ABS/ABS/PC | ABS/Steel | ABS/ABS/PC |
| Dynamic friction coefficient | | 0.20/0.19 | 0.201/0.19 | 0.23/0.20 | 0.22/0.21 | 0.19/0.23 | 0.21/0.19 |
| Abrasion amount (mg) | | | | | | | |
| Test piece | | 0/0 | 0.1/0 | 0.1/0.1 | 0.1/0.1 | 0/0.4 | 0.1/0.1 |
| Counterpart member | | 0.5/0.3 | 0.5/0.3 | 0.3/0.2 | 0.5/0.3 | 0.3/0 | 0.5/0.3 |
| Flame-retardancy (UL-94) Thickness: 0.8 mm | | — | V-0 | V-0 | V-0 | V-0 | V-0 |

N.B. Acid-modified PBT: a polybutylene terephthalate resin modified with 12 mol % of isophthalic acid

TABLE 4

|  |  | Comp. Ex.1 | Comp. Ex.2 | Comp. Ex.3 | Comp. Ex.4. | Comp. Ex.5. | Comp. Ex.6. | Comp. Ex.7 | Comp. Ex.8 |
|---|---|---|---|---|---|---|---|---|---|
| (A) | PBT | 70 | 70 | 70 | 70 | 70 | 70 | 50 | 50 |
|  | Acid-modified PBT |  |  |  |  |  |  |  |  |
| (B) | ABS | 30 | 30 | 30 | 30 | 30 | 30 | 50 | 50 |
|  | AES |  |  |  |  |  |  |  |  |
| (C) | PE-g-AN/S |  |  |  | 5.0 | 5.0 |  |  | 5.0 |
|  | PE-g-PMMA |  |  |  |  |  |  |  |  |
|  | PE |  |  |  |  |  | 5.0 |  |  |
| (D) | Ethylene glycol monoisostearate |  |  |  |  | 2.0 | 2.0 |  |  |
|  | Isotridecyl stearate |  |  |  |  |  |  |  |  |

TABLE 4-continued

|   |   | Comp. Ex.1 | Comp. Ex.2 | Comp. Ex.3 | Comp. Ex.4 | Comp. Ex.5 | Comp. Ex.6 | Comp. Ex.7 | Comp. Ex.8 |
|---|---|---|---|---|---|---|---|---|---|
| (D') | Ethylene glycol monostearate |  |  |  | 2.0 |  |  |  |  |
|  | Polytetrafluoroethylene |  | 5.0 |  |  |  |  |  |  |
| (E) | Glass fibre |  |  |  |  |  |  |  |  |
|  | Glass flake |  |  |  |  |  |  |  |  |
| (F) | Brominated epoxy resin |  |  |  |  |  |  |  |  |
|  | Polypentabromobenzyl acrylate |  |  |  |  |  |  |  |  |
| (G) | Antimony trioxide |  |  |  |  |  |  |  |  |
| Surface of the moulded article |  | 5 | 4 | 5 | 5 | 2 | 1 | 5 | 5 |
| Bending elastic modulus (MPa) |  | 2,570 | 2,420 | 2,440 | 2,400 | 2,500 | 2,350 | 2,540 | 2,420 |
| Sliding properties |  |  |  |  |  |  |  |  |  |
| Counterpart member |  | ABS/Steel | ABS | ABS/Steel | ABS/Steel | ABS/Steel | ABS | ABS/Steel | ABS/Steel |
| Dynamic friction coefficient |  | 0.35/0.50 | 0.47 | 0.40/0.31 | 0.23/0.25 | 0.23/0.25 | 0.40 | 0.55/0.53 | 0.49/0.34 |
| Abrasion amount (mg) |  |  |  |  |  |  |  |  |  |
| Test piece |  | 2.0/2.2 | 2.3 | 2.4/1.7 | 0.4/0.6 | 1.3/1.4 | 2.1 | 2.9/2.4 | 3.3/2.0 |
| Counterpart member |  | 2.7/0 | 2.5 | 2.8/0 | 0.8/0 | 1.8/0 | 2.3 | 3.5/0 | 4.0/0 |
| Flame-retardancy (UL-94) Thickness: 0.8 mm |  | — | — | — | — | — | — | — | — |

N.B. Acid-modified PBT: a polybutylene terephthalate resin modified with 12 mol % of isophthalic acid

TABLE 5

|   |   | Comp. Ex.9 | Comp. Ex.10 | Comp. Ex.11 | Comp. Ex.12 | Comp. Ex.13 | Comp. Ex.14 | Comp. Ex.15 | Comp. Ex.16 |
|---|---|---|---|---|---|---|---|---|---|
| (A) | PBT | 50 | 70 | 70 |  |  | 70 | 70 | 70 |
|  | Acid-modified PBT |  |  |  | 70 | 70 |  |  |  |
| (B) | ABS | 50 | 30 |  | 30 | 30 | 30 | 30 | 30 |
|  | AES |  |  | 30 |  |  |  |  |  |
| (C) | PE-g-AN/S |  | 10 | 5.0 | 5.0 | 5.0 | 5.0 | 5.0 |  |
|  | PE-g-PMMA |  |  |  |  |  |  |  |  |
|  | PE |  |  |  |  |  |  |  |  |
| (D) | Ethylene glycol monoisostearate | 2.0 |  |  |  |  |  |  |  |
|  | Isotridecyl stearate |  |  |  |  |  |  |  |  |
| (D') | Ethylene glycol monostearate |  |  |  |  | 2.0 |  | 2.0 |  |
|  | Polytetrafluoroethylene |  |  |  |  |  |  |  | 5.0 |
| (E) | Glass fibre |  |  |  |  |  | 20 | 20 | 20 |
|  | Glass flake |  |  |  |  |  |  |  |  |
| (F) | Brominated epoxy resin |  |  |  |  |  |  |  |  |
|  | Polypentabromobenzyl acrylate |  |  |  |  |  |  |  |  |
| (G) | Antimony trioxide |  |  |  |  |  |  |  |  |
| Surface of the moulded article |  | 2 | 4 | 5 | 5 | 5 | 5 | 5 | 4 |
| Bending elastic modulus (MPa) |  | 2,490 | 2,280 | 2,470 | 2,430 | 2,380 | 5,980 | 5,900 | 5,600 |
| Sliding properties |  |  |  |  |  |  |  |  |  |
| Counterpart member |  | ABS/Steel | ABS/Steel | ABS/Steel | ABS | ABS | ABS/ABS/PC | ABS/ABS/PC | ABS |
| Dynamic friction coefficient |  | 0.33/0.27 | 0.33/0.27 | 0.38./0.31 | 0.36 | 0.25 | 0.36/0.30 | 0.24/0.22 | 0.60 |
| Abrasion amount (mg) |  |  |  |  |  |  |  |  |  |
| Test piece |  | 1.9/1.5 | 2.1/1.5 | 2.4/1.8 | 2.0 | 0.5 | 1.0/0.8 | 0.3/0.3 | 1.7 |
| Counterpart member |  | 2.4/0 | 2.6/0 | 2.6/0 | 2.9 | 0.9 | 4.5/3.7 | 1.5/1.4 | 5.1 |
| Flame-retardancy (UL-94) Thickness: 0.8 mm |  | — | — | — | — | — | — | — | — |

N.B. Acid-modified PBT: a polybutylene terephthalate resin modified with 12 mol % of isophthalic acid

TABLE 6

|   |   | Comp. Ex.17 | Comp. Ex.18 | Comp. Ex.19 | Comp. Ex.20 | Comp. Ex.21 |
|---|---|---|---|---|---|---|
| (A) | PBT | 50 | 70 | 70 | 70 | 70 |
|  | Acid-modified PBT |  |  |  |  |  |
| (B) | ABS | 50 | 30 | 30 | 30 | 30 |
|  | AES |  |  |  |  |  |

TABLE 6-continued

|   |   | Comp. Ex.17 | Comp. Ex.18 | Comp. Ex.19 | Comp. Ex.20 | Comp. Ex.21 |
|---|---|---|---|---|---|---|
| (C) | PE-g-AN/S | 5.0 | 5.0 |  | 5.0 |  |
|  | PE-g-PMMA |  |  |  |  |  |
|  | PE |  |  |  |  |  |
| (D) | Ethylene glycol monoisostearate |  |  | 2.0 |  | 2.0 |
|  | Isotridecyl |  |  |  |  |  |
| (D') | Ethylene glycol monostearate |  |  |  |  |  |
|  | Polytetrafluoroethylene |  |  |  |  |  |
| (E) | Glass fibre | 20 | 20 | 20 | 20 | 20 |
|  | Glass flake |  | 20 | 20 |  |  |
| (F) | Brominated epoxy resin |  |  |  | 15 | 15 |
|  | Polypentabromobenzyl acrylate |  |  |  |  |  |
| (G) | Antimony trioxide |  |  |  | 5 | 5 |
| Surface of the moulded article | | 5 | 5 | 2 | 5 | 2 |
| Bending elastic modulus (MPa) | | 5,720 | 7,310 | 7,320 | 6,050 | 6,110 |
| Sliding properties | | | | | | |
| Counterpart member | | ABS | ABS | ABS | ABS | ABS |
| Dynamic friction coefficient | | 0.49 | 0.40 | 0.30 | 0.48 | 0.35 |
| Abrasion amount (mg) | | | | | | |
| Test piece | | 1.5 | 1.0 | 0.8 | 1.0 | 2.1 |
| Counterpart member | | 5.3 | 4.3 | 2.1 | 4.4 | 2.6 |
| Flame-retardancy (UL-94) | | — | — | — | V-0 | V-0 |
| Thickness: 0.8 mm | | | | | | |

N.B. Acid-modified PBT: a polybutylene terephthalate resin modified with 12 mol % of isophthalic acid

What is claimed is:

1. A thermoplastic resin composition which comprises:
   (A) a thermoplastic polyester resin,
   (B) a rubber-modified styrenic graft copolymer having at least an aromatic vinyl monomer grafted to a rubber component which is selected from the group consisting of conjugated diene rubbers, ethylene-propylene rubbers, acrylic rubbers, ethylene-vinyl acetate copolymers and halogenated polyolefins, and wherein the content of the rubber component is 10 to 40% by weight of the rubber-modified styrenic graft copolymer,
   (C) an olefinic graft or block copolymer having a branched or cross-linked structure which includes (c-1) at least one olefinic polymer segment or fragment selected from the group consisting of polyethylenes, polypropylenes and ethylene-ethylacrylate copolymers, and (c-2) at least one vinyl-series polymer segment or fragment chemically bonded to one another, wherein the weight ratio of the olefinic polymer segment or fragment (c-1) to the vinyl-series polymer segment or fragment (c-2) is between about 95/5 to 40/60; and
   (D) a branched ester selected from the group consisting of (d-1) an ester derived from a branched fatty acid having about 16 to 22 carbon atoms and a straight-chained higher alcohol having about 14 to 22 carbon atoms (d-2) an ester derived from a branched alcohol having about 16 to 22 carbon atoms and a straight-chained higher fatty acid having about 14 to 22 carbon atoms, (d-3) an ester derived from said branched fatty acid and said branched alcohol, and (d-4) an ester derived from a branched fatty acid having about 16 to 22 carbon atoms and a polyhydric alcohol, wherein
said resin composition comprises 0.5 to 40 parts by weight of the olefinic graft or block copolymer (C) and 0.1 to 15 parts by weight of the branched ester (D) relative to 100 parts by weight of the resin composition comprising 30 to 95% by weight of the thermoplastic polyester resin (A) and 70 to 5% by weight of the rubber-modified styrenic graft copolymer (B).

2. A thermoplastic resin composition as claimed in claim 1, wherein said thermoplastic polyester resin (A) comprises a crystalline polyester resin containing at least 60% by weight of a polyalkylene arylate unit.

3. A thermoplastic resin composition as claimed in claim 1, wherein said thermoplastic polyester resin (A) comprises a crystalline polyester resin containing at least 60% by weight of a polyalkylene terephthalate unit or a polyalkylene naphthalate unit.

4. A thermoplastic resin composition as claimed in claim 1, wherein said thermoplastic polyester resin (A) is a polybutylene terephthalate, a copolymer containing 60% by weight or more of a polybutylene terephthalate unit, or a polyester-series resin composition comprising a polybutylene terephthalate as a main component.

5. A thermoplastic resin composition as claimed in claim 1, wherein said rubber-modified styrenic graft copolymer (B) is a polymer obtained by graft polymerization of said aromatic vinyl monomer and a vinyl cyanide monomer with a rubber component.

6. A thermoplastic resin composition as claimed in claim 1, wherein said graft or block copolymer (C) olefinic comprises (c-1) said olefinic polymer segment or fragment and (c-2) a homo- or co-polymer segment or fragment of at least one monomer selected from an acrylic monomer or a styrenic monomer.

7. A thermoplastic resin composition as claimed in claim 1, wherein the fatty acid or the alcohol constituting the branched ester (D) has 16 to 22 carbon atoms.

8. A thermoplastic resin composition as claimed in claim 1, wherein said branched ester (D) is an ester oil of a higher fatty acid having at least one branched chain and a polyhydric alcohol.

9. A thermoplastic resin composition as claimed in claim 1, wherein said resin composition further comprises (E) an inorganic filler.

10. A thermoplastic resin composition as claimed in claim 9, wherein said inorganic filler (E) is a fibrous inorganic filler or a plate-like inorganic filler.

11. A thermoplastic resin composition as claimed in claim 9, wherein said inorganic filler (E) is at least one species selected from a glass fibre or a mica.

12. A thermoplastic resin composition as claimed in claim 9, wherein the proportion of said inorganic filler (E) is 10 to 100 parts by weight relative to 100 parts by weight of the resin composition composed of the component (A) and the component (B).

13. A thermoplastic resin composition as claimed in claim 1, wherein said resin composition further comprises (F) a flame-retardant and (G) an inorganic flame-retardant auxiliary.

14. A thermoplastic resin composition as claimed in claim 13, wherein said composition comprises 0.5 to 35 parts by weight of the flame-retardant (F) and 0.1 to 20 parts by weight of the inorganic flame-retardant auxilary (G) relative to 100 parts by weight of the resin composition composed of the component (A) and the component (B).

15. A method of producing a thermoplastic resin as in claim 1 composition which comprises mixing the components (A), (B), (C) and (D).

16. A moulded article as produced by moulding the thermoplastic resin composition of claim 1.

17. A moulded article as claimed in claim 16, wherein said moulded article is a sliding member.

18. A thermoplastic resin composition as claimed in claim 1, wherein the content of said olefinic polymer (c-1) in said olefinic graft or block copolymer (C) is 40 to 95% by weight.

19. A thermoplastic resin composition as claimed in claim 1, wherein the content of said rubber component in said rubber-modified styrenic graft copolymer (B) is 10 to 40% by weight, and wherein the content of said olefinic polymer (c-1) in said olefinic graft or block copolymer (C) is 50 to 90% by weight.

20. A thermoplastic resin composition which comprises:

(A) a thermoplastic polyester resin, (B) a rubber-modified styrenic graft copolymer consisting essentially of a polymer obtained by the graft polymerization of an aromatic vinyl monomer and a vinyl cyanide monomer with a rubber component which is selected from the group consisting of conjugated diene rubbers, ethylene-propylene rubbers, acrylic rubbers, ethylene-vinyl acetate copolymers and halogenated polyolefins, and wherein the content of the rubber component is 10 to 40% by weight of the rubber-modified styrenic graft copolymer, (C) an olefinic graft or block copolymer having a branched or cross-linked structure which consists essentially of (c-1) at least one olefinic polymer segment or fragment selected from the group consisting of polyethylenes, polypropylenes and ethylene-ethylacrylate copolymers, and (c-2) at least one vinyl-series polymer segment or fragment chemically bonded to one another, wherein the weight ratio of the olefinic polymer segment or fragment (c-1) to the vinyl-series polymer segment or fragment (c-2) is between about 95/5 to 40/60; and (D) a branched ester selected from the group consisting of (d-1) an ester derived from a branched fatty acid having about 16 to 22 carbon atoms and a straight-chained higher alcohol having about 14 to 22 carbon atoms, (d-2) an ester derived from a branched alcohol having about 16 to 22 carbon atoms and a straight-chained higher fatty acid having about 14 to 22 carbon atoms, (d-3) an ester derived from said branched fatty acid and said branched alcohol, and (d-4) an ester derived from a branched fatty acid having about 16 to 22 carbon atoms and a polyhydric alcohol, wherein said resin composition comprises 0.5 to 40 parts by weight of the olefinic graft or block copolymer (C) and 0.1 to 15 parts by weight of the branched ester (D) relative to 100 parts by weight of the resin composition comprising 30 to 95% by weight of the thermoplastic polyester resin (A) and 70 to 5% by weight of the rubber-modified styrenic graft copolymer (B).

* * * * *